United States Patent [19]

Lauro

[11] 4,106,560
[45] Aug. 15, 1978

[54] FALLING-FILM HEAT EXCHANGER

[75] Inventor: Fernand Lauro, Grenoble, France

[73] Assignee: Commissariat a l'Energie Atomique, Paris, France

[21] Appl. No.: 797,826

[22] Filed: May 17, 1977

[30] Foreign Application Priority Data

May 26, 1976 [FR] France .................... 76 16047

[51] Int. Cl.² .......................... F28B 9/00; F28D 7/00; F28F 9/02; F17C 7/02
[52] U.S. Cl. ...................................... 165/159; 62/52; 165/110; 165/115; 165/174
[58] Field of Search .............. 29/157.4; 165/110, 115, 165/159, 174; 62/52

[56] References Cited

U.S. PATENT DOCUMENTS

| 3,387,836 | 6/1968 | Stookey | 165/159 |
|---|---|---|---|
| 3,898,163 | 8/1975 | Mott | 285/354 |
| 3,913,667 | 10/1975 | Meylan et al. | 165/115 |

FOREIGN PATENT DOCUMENTS

| 687,700 | 7/1930 | France | 285/354 |
|---|---|---|---|
| 662,537 | 6/1938 | Fed. Rep. of Germany | 165/115 |
| 1,037,047 | 7/1966 | United Kingdom | 165/174 |

Primary Examiner—Charles J. Myhre
Assistant Examiner—Sheldon Richter
Attorney, Agent, or Firm—McNenny, Pearne, Gordon, Gail, Dickinson & Schiller

[57] ABSTRACT

A primary fluid is circulated within vertical flexible tubes enclosed within a fluid-tight shell and a secondary fluid flows over the external tube walls. A secondary fluid admission chamber is formed in the top portion of the shell by a horizontal tube plate traversed by primary fluid distribution means. The upper end of each tube is fixed on a unit of revolution having a passage for the primary fluid and constituted by a sliding ring and two components. The first component has a frusto-conical external surface which cooperates with the internal wall of the ring. The second component has a cylindrical external surface provided with grooves which define passages for the downflow of secondary fluid with the internal wall of a tube-plate hole.

7 Claims, 2 Drawing Figures

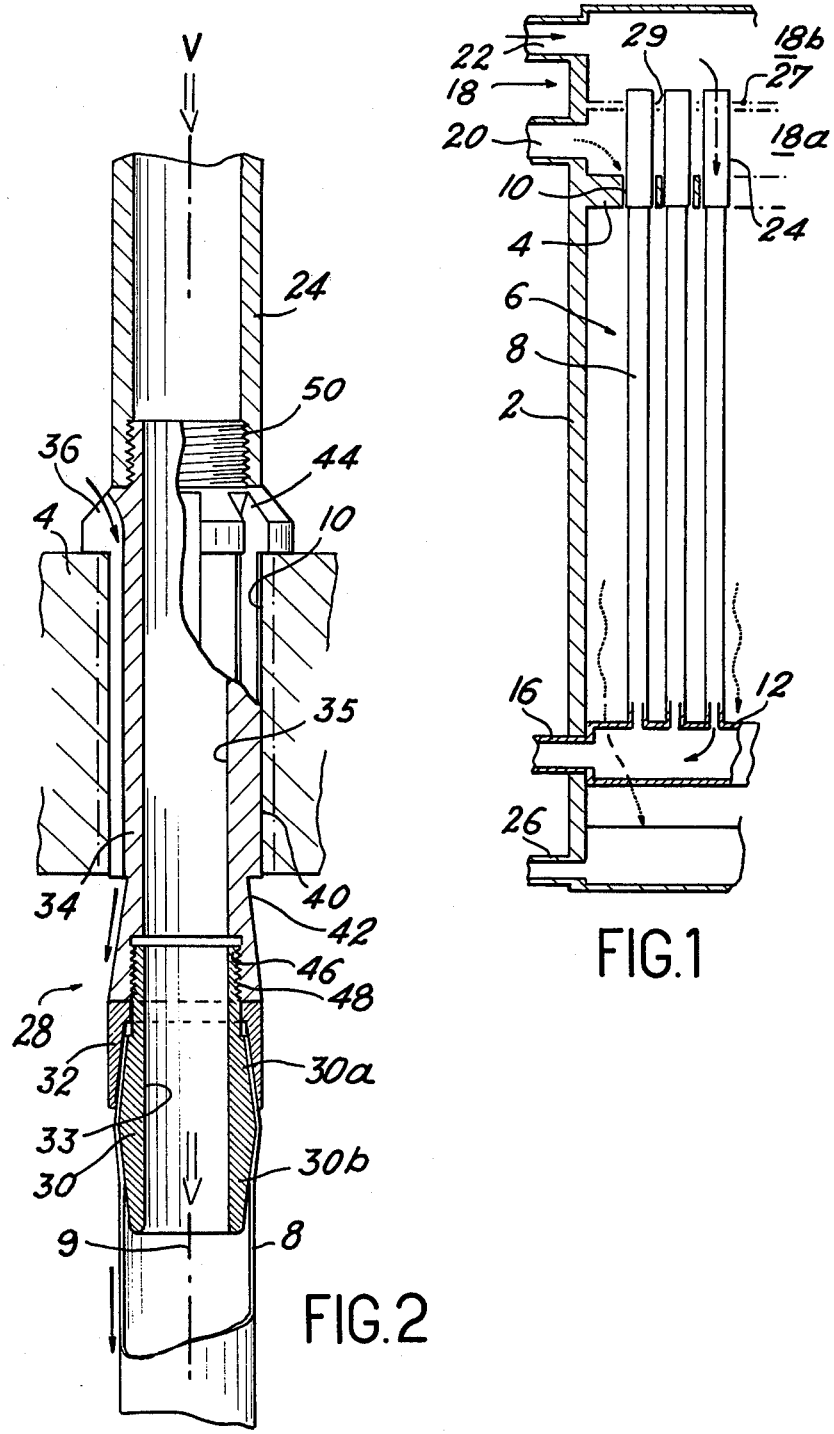

FALLING-FILM HEAT EXCHANGER

This invention relates to a heat exchanger of the so-called falling-film type which has vertical flexible tubes and is primarily intended for the evaporation of a saline solution.

It is recalled that a vertical-tube heat exchanger for heating a secondary fluid by means of a primary fluid is of the so-called falling-film type when said secondary fluid flows under gravity in thin films along the external wall of the tubes in which the primary fluid circulates.

In more exact terms, this invention relates to a heat exchanger of the type aforesaid in which novel arrangements are made for attaching the flexible tubes at the upper ends and for establishing on the external walls of said tubes a continuous downflowing thin film of secondary fluid to be heated.

In even more exact terms, the heat exchanger in accordance with the invention is of the type comprising within a fluid-tight shell a plurality of vertical flexible tubes for the circulation of primary fluid within said tubes and for the flow of secondary fluid over the external wall of said tubes, at least one stationarily fixed horizontal tube plate pierced by holes and primary fluid distribution means, an admission chamber for said secondary fluid being defined in the upper portion of said shell by said horizontal tube plate and traversed by said primary fluid distribution means. Said heat exchanger is distinguished by the fact that the upper end of each tube aforesaid is fixed on a unit of revolution with respect to the axis of the tube so as to be applied against said tube plate and connected to primary fluid distribution means. The unit aforesaid is provided with an internal passage for said primary fluid and constituted by a sliding annular ring and by two so-called first and second members. Said first member is provided externally with at least one frusto-conical surface so designed as to ensure attachment of said tube by cooperating with the internal wall of complementary surface of said ring. Said second member has a cylindrical external surface provided with grooves extending to a height at least equal to the thickness of said tube plate in such a manner as to ensure that passages for the downflow of said secondary fluid are defined with the internal wall of a hole of said tube plate. The lower end of said second member is rigidly fixed to said first member and the upper end of said second member is rigidly fixed to said primary fluid distribution means.

The main advantage of the heat exchanger in accordance with the invention as defined in the foregoing lies in the fact that the unit aforesaid is so designed as to have a small overall diameter and thus to permit:
particularly strong attachment of said tubes in respect of preferential design parameters of said first member,
suitable downflow of the secondary fluid in order to form a continuous thin film along the tubes,
admission of primary fluid to the tubes with a minimum pressure drop.

In accordance with a particular arrangement of the invention, the first member which serves to attach the tube and has a frusto-conical surface of revolution with respect to the axis of said tube is oriented in such a manner as to ensure that the upper end which preferably delimits a circumference whose diameter is substantially equal to the internal diameter of the tube is located nearest said axis. Moreover, it is readily apparent that said frusto-conical surface is inclined with respect to said axis in such a manner as to ensure that the wall of said tube can be suitably applied by hand against said surface.

In accordance with another particular arrangement of the invention, said cylindrical surface of the second member is provided with helical grooves of variable section such that the downflow of secondary fluid takes place with a slight rotational movement in order to obtain a flow of said fluid along the tubes in a continuous film.

In a first alternative embodiment of the device according to the invention, said first member has two surfaces consisting respectively of lower and upper frusto-conical surfaces in contiguous relation, said upper surface being such as to correspond to the aforesaid frusto-conical surface for the attachment of the tube.

In another alternative embodiment of the device according to the invention, said second member is further provided externally with a frusto-conical surface which forms an extension of said cylindrical surface at the lower end thereof, the orientation of said surface being such that said lower end which preferably delimits a circumference having a diameter substantially equal to the external diameter of said ring is located at the greatest distance from the axis of said tube.

Further distinctive features and advantages of the present invention will become more clearly apparent from the following description of one example of construction of a falling-film evaporator which embodies the novel arrangements of the invention and is intended for the treatment of a brine, this example of construction being given solely by way of illustration but not in any sense by way of limitation, reference being made to the accompanying drawings, wherein:

FIG. 1 is a diagrammatic presentation of a falling-film evaporator;

FIG. 2 is a partial view of the evaporator to a larger scale and showing the arrangements adopted in accordance with the invention for the attachment of the flexible tubes of the evaporator and for the downflow of the secondary fluid.

Although the practical application of the invention is not limited to the type of heat exchanger which is illustrated in FIG. 1, it can be noted that a heat exchanger of this type and having the function of evaporator for the secondary fluid which can consist of a brine is particularly well suited to this application.

Referring first to FIG. 1, it will be seen that the evaporator in accordance with the invention is enclosed within a fluid-tight shell 2 which defines a heat-exchange space 6 in conjunction with a stationarily fixed horizontal tube plate 4, said plate being joined to the lateral wall of said shell 2 in leak-tight manner.

Flexible plastic tubes 8 are mounted vertically within the heat-exchange space 6 aforesaid. The thin wall of each tube 8 has a thickness which is either smaller than or equal to 100 $\mu$ and defines a surface for heat exchange between a "hot" primary fluid consisting of a gas such as steam in this example of construction and a secondary fluid to be evaporated and consisting of a saline solution in this example.

The upper ends of the tubes 8 aforesaid are connected to said metal or plastic tube plate 4 at the level of holes such as 10 formed in this latter and the lower ends of said tubes are connected to manifolds such as those designated by the reference 12, said manifolds being each provided with a discharge pipe 16 which passes through said shell 2 in leak-tight manner.

As will be explained below, said tubes 8 are suspended from said horizontal plate 4 by means designed in accordance with the arrangements of the invention in such a manner as to secure the upper ends of the tubes 8, to supply said tubes with gas and to ensure downflow of the saline solution so as to form a thin falling film of said solution on the external periphery of said tubes.

It should in fact be observed that, in the case of the evaporator which is shown in FIG. 1, the saline solution is evaporated as it flows over the external periphery of the tubes in the form of a thin film by means of the "hot" gas which is circulated within the interior of said tubes 8.

Moreover, the lower ends of said tubes 8 are connected to the manifold 12 by means which are preferably designed to permit free longitudinal expansion of the tubes. Such means can be as described in patent Application No EN 73 32372 filed in the name of the present Applicant on Sept. 7, 1973.

It can also be seen in FIG. 1 that said horizontal tube plate 4 delimits within the upper portion of said shell 2 a chamber 18 which is subdivided into two spaces 18a and 18b which are intended respectively for the admission of the saline solution to be evaporated and of the "hot" gas through the supply pipes 20 and 22.

Within said chamber 18, tubular elements such as those designated by the reference 24 are arranged vertically opposite to the holes 10 of said tube plate 4. Said elements 24 open at their upper ends into the space 18b of said gas-filled chamber 18 and at their lower ends into said tube 8.

It is worthy of note that said spaces 18a and 18b can be separated in leak-tight manner by means of a plate 27 preferably formed of elastomer and pierced by holes 29 for the insertion of said tubular elements 24. Said plate 27 is applied against shouldered portions of said elements 24 and can be maintained in position by means of sliding rings associated with a certain number of said elements 24.

It can be readily understood that, when no provision is made for the aforesaid plate 27, the level of the liquid-gas interface is continuously maintained by suitable means below the upper end of said tubular elements 24.

The operation of the evaporator which is shown in FIG. 1 accordingly takes place in the manner which will now be described. As already mentioned, the gaseous primary fluid is introduced into the chamber 18 through the pipe 22 in order to be circulated by means of the elements 24 within said tubes 8 from the upper end to the lower end of these latter and then to be discharged through the manifold 12 and the pipe 16.

The secondary fluid consisting of saline solution is introduced into the chamber 18 through the pipe 20, then passed downwards through the tube plate 4 into the heat-exchange space 6 in order to flow along the tubes 8 in a thin film and finally to be recovered through the pipe 26.

There is shown in FIG. 2 a partial diagrammatic view of the evaporator in accordance with FIG. 1 and embodying the novel arrangements of the invention in regard to the above-mentioned means for suspending the tubes 8 from said horizontal plate 4.

In this figure, the same references are assigned to the parts which have already been described and illustrated in FIG. 1.

Thus there are again shown in this figure one of said tubes 8, said horizontal tube plate 4 and the tubular element 24 for distributing the primary fluid within the tube.

It will accordingly be noted that the plate 4 supports the tube 8 by means of a unit which is generally designated in FIG. 2 by the reference 28 and which is preferably made of plastic material. Said unit 28 is also intended to permit suitable downflow of the secondary fluid through said tube plate 4 and easy assembly of the tubes within the evaporator.

As illustrated in the figure, said unit 28 thus comprises a sleeve 30 fitted within the top portion of said tube 8, a sliding annular ring 32 which surrounds said tube 8 and cooperates with said sleeve 30 in order to secure said tube 8 and a secondary distributor 34 which is applied against said tube plate 4 by means of an annular shoulder 36 formed at the upper end of said distributor. As will hereinafter become apparent, there are formed along the internal wall of the above-mentioned orifice 10 passages for the downflow of said secondary fluid. Said distributor 34 is connected at one end to said sleeve 30 and at the other end to said tubular element 24.

It can be seen that said sleeve 30 and said distributor 34 are provided respectively with internal bores 33 and 35 for delimiting through said unit 28 a passage of constant cross-section for the primary fluid.

In more precise terms, said sleeve 30 which is of revolution with respect to the axis 9 of the tube 8 is provided externally with two surfaces 30a and 30b which are contiguous and inclined with respect to said axis 9. Said surfaces correspond to the lateral walls of two cone frustums which are joined together at the base of larger section, the diameter of which is slightly larger than that of the tube 8. It is worthy of note that the base diameter and the angle of slant of the cone frustum corresponding to said surface 30a are such that the flexible wall of said tube 8 can be applied against this latter in a reliable manner and that the overall diametrical size of said sleeve 30 is reduced to a minimum. Furthermore, it is readily apparent that the cone frustum corresponding to the surface 30b is such that the manual introduction of the sleeve 30 into said tube 8 is facilitated. It can also be pointed out that the external surface of said sleeve 30 could consist only of the frusto-conical surface 30a which is employed for the attachment of the tube since the surface 30b is only intended to facilitate the assembly of the tube 8 on the sleeve 30.

Moreover, it can be noted with reference to FIG. 2 that the external profile of said distributor 34 which is of revolution with respect to said axis 9 is defined successively from said annular shoulder 36 by a cylindrical surface 40, then by a frusto-conical surface 42. Another noteworthy feature is that said cylindrical surface 40 is in contact with the internal wall of said hole 10 and provided with grooves 44 which define said passages for the downflow of the secondary fluid between said distributor 34 and said hole 10. In accordance with a further arrangement of interest, said frusto-conical surface 42 is oriented in such a manner as to ensure that the lower end of this latter which delimits a circumference whose diameter is substantially equal to said of said ring 32 is located at the greatest distance from said axis.

In accordance with the invention, said grooves 34 which are formed in said surface 40 are preferably helical. The pitch and cross-section of said grooves are such that these latter give rise to rotational motion of the secondary fluid which is intended to form a film on the external wall of said tubes, said film being perfectly distributed over said tubes in spite of the non-wettability of the plastic which forms said tubes.

It can also be seen that the upper portion of said sleeve 30 has a cylindrical extension 46 fitted within a bore 48 of complementary shape which is formed in the internal wall of said distributor 34. Said extension 46 has a threaded portion in cooperating relation with a complementary internal screw-thread of said bore 48 in order to secure said sleeve 30 to said distributor 34.

It is pointed out that said extension 46 of said sleeve 30 and the bore 48 of the distributor are so designed as to ensure that the bores 33 and 35 form a passage through said unit 28 and that there is no interruption of continuity in the wall of said passage.

It will readily be apparent that said sleeve 30 and said distributor 34 can also be joined together by induction welding, by means of a bayonet-type coupling system or by any other known means. The same applies to the interassembly of the distributor 34 and the tubular element 24 which is achieved in FIG. 2 by means of the screw-thread 50.

When the height of said cylindrical surface 40 and the thickness of said tube plate 4 have different values, a cylindrical sleeve (not shown) is associated with said distributor 34 so as to form said passages for the downflow of secondary fluid to a height corresponding to that of said cylindrical surface 40.

By virtue of the design concept of said unit 28 as described in the foregoing, mounting of said tubes 8 can readily be carried out in respect of a suitable overall diametrical size of the components of said unit 28. In fact, it is only necessary to introduce a unit 28 which has previously been rigidly fixed to a tube 8 and a tubular element 24 into each hole 10 of the tube plate 4 until said annular shoulder 36 is applied against said plate 4. Said tube is rigidly fixed to said unit by fixing said tube between said sleeve 30 and said ring 32, then by connecting said distributor 34 to said sleeve 30.

Finally, once said tubes have thus been mounted, a plate formed of elastomer can be placed in position in order to separate the gas and liquid spaces of the chamber 18 which is maintained against annular shoulders formed on the tubular elements 24 by means of rings associated with a certain number of said tubular elements.

What I claim is:

1. A thin falling-film heat exchanger of the type comprising within a fluid-tight shell a plurality of vertical flexible tubes for the circulation of primary fluid within said tubes and for the flow of secondary fluid over the external wall of said tubes, at least one horizontal tube plate pierced by holes and primary fluid distribution means, an admission chamber for said secondary fluid being defined in the upper portion of said shell by said tube plate and traversed by said primary fluid distribution means, wherein the upper end of each tube aforesaid is fixed on a unit which is of revolution with respect to the axis of the tube so as to be applied against said tube plate and connected to primary fluid distribution means, said unit being provided with an internal passage for said primary fluid and constituted by a sliding annular ring and by two so-called first and second members, said first member being provided externally with at least one frusto-conical surface so designed as to ensure attachment of said tube by cooperating with the internal wall of complementary surface of said ring, said second member being such as to have a cylindrical external surface provided with grooves extending to a height at least equal to the thickness of said tube plate in such a manner as to ensure that passages for the downflow of said secondary fluid are defined with the internal wall of a hole of said tube plate.

2. A heat exchanger according to claim 1, wherein said frusto-conical surface is oriented in such a manner as to ensure that the upper end thereof which delimits a circumference whose diameter is substantially equal to the internal diameter of the tube is located nearest the axis of said tube.

3. A heat exchanger according to claim 1, wherein said first member has two surfaces consisting respectively of lower and upper frusto-conical surfaces in contiguous relation, said upper surface being intended to cooperate with the internal wall of said ring.

4. A heat exchanger according to claim 1, wherein said grooves of said second member are helical.

5. A heat exchanger according to claim 1, wherein the height of the cylindrical surface of said second member is greater than the thickness of said tube plate and wherein an annular cylindrical sleeve is associated with said second member so as to define said passages for the downflow of secondary fluid to a height which is equal to that of said cylindrical surface.

6. A heat exchanger according to claim 1, wherein said second member is further provided externally with a frusto-conical surface which forms an extension of said cylindrical surface at the lower end thereof, said frusto-conical surface being oriented in such a manner as to ensure that the lower end thereof is located at the greatest distance from the axis of said tube.

7. A heat exchanger according to claim 6, wherein the lower end of said frusto-conical surface defines a circumference having a diameter which is substantially equal to the external diameter of said ring.

* * * * *